United States Patent [19]

Suzuki et al.

[11] Patent Number: 4,987,205

[45] Date of Patent: Jan. 22, 1991

[54] POLYPHENOL-ALKANOLAMINE MODIFIED EPOXY RESIN COMPOSITION, PROCESS FOR PREPARATION THEREOF AND PAINT COMPOSITION COMPRISING THIS MODIFIED EPOXY RESIN COMPOSITION

[75] Inventors: Goro Suzuki; Matsuura Seiji, both of Ichihara, Japan

[73] Assignee: Mitsui Petrochemical Industries, Ltd., Chiyoda, Japan

[21] Appl. No.: 310,935

[22] Filed: Feb. 16, 1989

[30] Foreign Application Priority Data

Feb. 17, 1988 [JP] Japan .................. 63-32762

[51] Int. Cl.$^5$ .................. C08G 59/14; C08G 59/64
[52] U.S. Cl. .................. 528/104; 528/111; 525/523; 549/551
[58] Field of Search .................. 528/104, 111

[56] References Cited

U.S. PATENT DOCUMENTS

| | | | |
|---|---|---|---|
| 3,317,471 | 5/1967 | Johnson et al. .................. | 523/456 |
| 4,152,285 | 5/1979 | Thomassen .................. | 524/906 |
| 4,162,244 | 7/1979 | Bertram .................. | 528/111 |
| 4,246,148 | 1/1981 | Shimp et al. .................. | 525/526 |
| 4,330,644 | 5/1982 | Allen .................. | 525/523 |
| 4,678,712 | 7/1987 | Elliot .................. | 528/104 |
| 4,835,225 | 5/1989 | Massingill, Jr. et al. .................. | 528/103 |

*Primary Examiner*—Earl Nielsen
*Assistant Examiner*—Frederick Krass
*Attorney, Agent, or Firm*—Birch, Stewart, Kolasch & Birch

[57] ABSTRACT

Disclosed is a modified epoxy resin composition comprising a resin having recurring units represented by the following general formula:

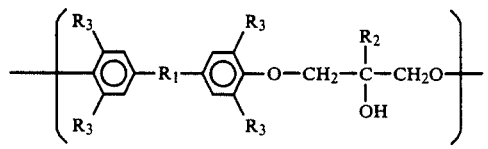

wherein $R_1$ stands for —$CH_2$—, $>CHCH_3$, $>C(CH_3)_2$,

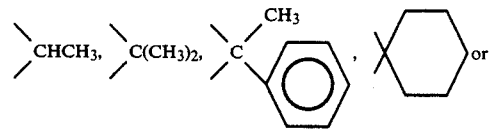

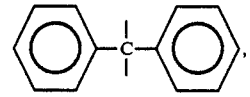

$R_2$ stands for H or —$CH_3$, $R_3$ stands for H or a halogen atom, and having an epoxy group, a phenolic hydroxyl group and a primary alcoholic hydroxyl group as terminal functional groups in specific amounts.

This composition has a high reactivity with an active methylol group, and when this composition is combined with a curing agent resin such as an amino resin or a phenolic resin, a coating having an excellent bending processability is obtained.

8 Claims, No Drawings

POLYPHENOL-ALKANOLAMINE MODIFIED EPOXY RESIN COMPOSITION, PROCESS FOR PREPARATION THEREOF AND PAINT COMPOSITION COMPRISING THIS MODIFIED EPOXY RESIN COMPOSITION

BACKGROUND OF THE INVENTION (1) Field of the Invention

The present invention relates to an epoxy resin composition having a phenolic hydroxyl group and a primary alcoholic hydroxyl group, which are introduced in the molecule terminals, and having a high reactivity with an active methylol group, a process for the preparation of this epoxy resin composition, and a paint composition comprising this epoxy resin composition.

(2) Description of the Related Art

A paint comprising an epoxy resin and a curing agent resin, for example, an amino resin such as a melamine resin or a urea resin, or a phenolic resin is known.

A paint of this type is excellent in characteristics such as the adhesion to a metal substrate and the chemical resistance, and is used for coated cans and the like.

However, this known paint is still insufficient in the flexibility of a formed coating, and hence, properties such as the coating strength are poor.

SUMMARY OF THE INVENTION

We found that a modified resin obtained by reacting a known epoxy resin with a bisphenol and a secondary alkanolamine to introduce a phenolic hydroxyl group and a primary alcoholic hydroxyl group has an increased reactivity with a phenolic resin or an amino resin, and when such a resin is used as a curing agent resin for the modified epoxy resin, a coating having a good flexibility and a high adhesion to a steel sheet is formed.

It is a primary object of the present invention to provide a modified epoxy resin prepared according to the above-mentioned procedures.

Another object of the present invention is to provide a process for the preparation of this modified epoxy resin.

Still another object of the present invention is to provide a paint composition comprising this modified epoxy resin and a resin having an active methylol group.

More specifically, in accordance with the present invention, there is provided a modified epoxy resin composition having a number average molecular weight (Mn) of 2000 to 5000 and containing, as functional groups, $1 \times 10^{-5}$ to $30 \times 10^{-5}$ equivalent/g of an epoxy group, $5 \times 10^{-5}$ to $20 \times 10^{-5}$ equivalent/g of a phenolic hydroxyl group and $30 \times 10^{-5}$ to $150 \times 10^{-5}$ equivalent/g of a primary alcoholic hydroxyl group.

In accordance with another aspect of the present invention, there is provided a process for the preparation of a modified epoxy resin having an epoxy group content of $1 \times 10^{-5}$ to $30 \times 10^{-5}$ equivalent/g, which comprises reacting a bisphenol type epoxy resin with a bisphenol and a secondary alkanolamine in amounts satisfying requirements represented by the following general formulae (i) and (ii):

$$\frac{40}{100} \leq \frac{Y}{X} \leq \frac{95}{100} \quad (i)$$

$$\frac{5}{100} \leq \frac{Z}{X} \leq \frac{50}{100} \quad (ii)$$

wherein X stands for the amount (equivalent) of the epoxy group in the starting epoxy resin, Y stands for the amount (equivalent) of the phenolic hydroxyl group of the bisphenol, and Z stands for the amount (mole) of the secondary alkanolamine.

In accordance with still another aspect of the present invention, there is provided a paint composition comprising a modified epoxy resin as set forth above and a curing agent resin having an active methylol group.

DETAILED DESCRIPTION OF THE PREFERRED EMBODIMENTS

The modified epoxy resin provided according to the present invention has, as functional groups, $1 \times 10^{-5}$ to $30 \times 10^{-5}$ equivalent/g, preferably $5 \times 10^{-5}$ to $20 \times 10^{-5}$ equivalent/g, of an epoxy group, $5 \times 10^{-5}$ to $30 \times 10^{-5}$ equivalent/g, preferably $8 \times 10^{-5}$ to $15 \times 10^{-5}$ equivalent/g, of a phenolic hydroxyl group, and $30 \times 10^{-5}$ to $150 \times 10^{-5}$ equivalent/g, preferably $40 \times 10^{-5}$ to $90 \times 10^{-5}$ equivalent/g, of a primary alcoholic hydroxyl group.

For example, the modified epoxy resin composition of the present invention comprises a resin having recurring units represented by the following general formula (1):

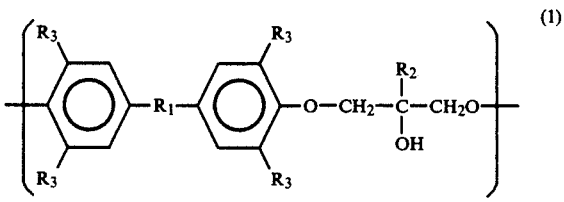

wherein $R_1$ stands for $-CH_2-$, $>CHCH_3$, $>C(CH_3)_2$,

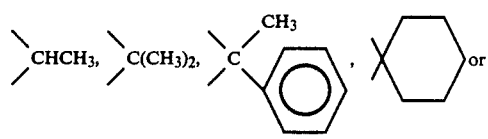

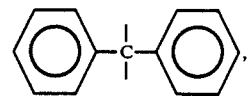

$R_2$ stands for H or $-CH_3$, $R_3$ stands for H or a halogen atom, and having an epoxy group, a phenolic hydroxyl group and a primary alcoholic hydroxyl group as terminal functional groups in the above-mentioned amounts.

In order to maintain the viscosity of an epoxy resin solution for a paint at an appropriate level and impart a good flexibility to the cured coating, this modified epoxy resin composition should have a number average molecular weight ($\overline{Mn}$) of 2000 to 5000, especially 2500 to 4000.

The preparation of this modified epoxy resin will now be described.

The modified epoxy resin of the present invention is easily obtained by using an epoxy resin having a high epoxy group content and reacting this epoxy resin with a bisphenol and a secondary alkanolamine.

An epoxy resin having a number average molecular weight ($\overline{M}n$) of 340 to 3000 and represented by the following general formula (2):

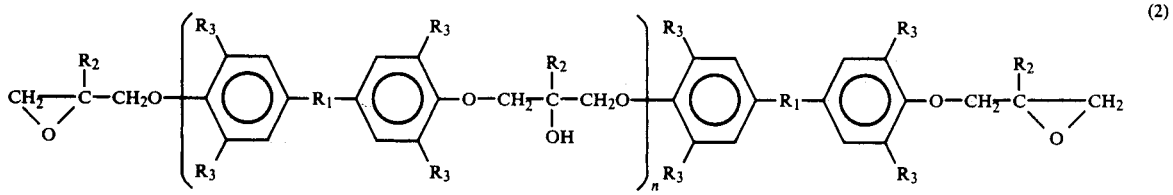

(2)

wherein n is a positive number inclusive of 0, and
R$_1$, R$_2$ and R$_3$ are as defined above, is preferably used as the starting epoxy resin.

As preferred examples, there can be mentioned glycidyl ethers and β-methylglycidyl ethers of bisphenols such as 2,2-bis(4-hydroxyphenyl)propane (generally called "bisphenol A"), 2,4-hydroxydiphenylmethane, bis(2-hydroxyphenyl)methane, bis(4-hydroxyphenyl)methane and 1,1-bis(4-hydroxyphenyl9ethane, which have an epoxy equivalent value of 170 to 2000, especially 170 to 1000.

As the bisphenol to be reacted with the starting epoxy resin, there can be mentioned a bisphenol represented by the following general formula (3):

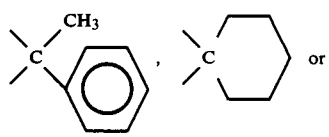

(3)

wherein R$_4$ stands for —CH$_2$—, >CHCH$_3$, >C(CH$_3$)$_2$,

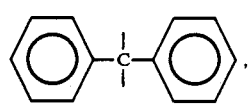

and R$_5$ stands for a hydrogen atom, a methyl group or a halogen atom.

As preferred examples, there can be mentioned 2,2-bis(4-hydroxyphenyl)propane (generally called "bisphenol A"), 2,2-bis(4-hydroxyphenyl)butane (generally called "bis-phenol B"), 1,1-bis(4-hydroxyphenyl)ethane (generally called "bisphenol D"), bis(4-hydroxyphenyl)methane (generally called "bisphenol F") and 4-hydroxyphenyl ether.

The bisphenol is used in such an amount that the amount (X equivalent) of the epoxy group contained in the starting epoxy resin and the amount (Y equivalent) of the phenolic hydroxyl group of the used bisphenol satisfy the following requirement:

$$\frac{40}{100} \leq \frac{Y}{X} \leq \frac{95}{100},$$

preferably $$\frac{80}{100} \leq \frac{Y}{X} \leq \frac{99}{100}.$$

As the secondary alkanolamine, there can be used compounds represented by the following general formulae (4) and (5):

(4)

and

(5)

wherein R$_6$, R$_7$ and R$_8$ independently stands for an alkylene group, preferably an alkylene group having 2 to 6 carbon atoms, and R stands for an alkyl group, preferably an alkyl group having 1 to 3 carbon atoms.

Among these secondary alkanolamines, diethanolamine, dipropanolamine, dipentanolamine, N-methylmethanolamine and N-ethylpropanolamine are preferred.

The secondary alkanolamine is reacted with the starting epoxy resin in such an amount that the amount (X equivalent) of the epoxy group contained in the starting epoxy resin and the amount (Z mole) of the secondary alkanolamine satisfy the requirement represented by the following formula:

$$\frac{5}{100} \leq \frac{Z}{X} \leq \frac{50}{100}$$

preferably $$\frac{10}{100} \leq \frac{Z}{X} \leq \frac{20}{100}$$

Since the speed of the reaction between the epoxy group and amine is high, all of the used secondary alkanolamine is reacted with the epoxy resin, with the result that the primary alcoholic hydroxyl group is present at the terminals of the epoxy resin.

The reaction of the epoxy resin with the bisphenol and the reaction of the epoxy resin with the secondary alkanolamine are carried out in the absence of a solvent or in the presence of a solvent inactive with an epoxy group, such as xylene, toluene or benzene, under atmospheric or elevated pressure at a temperature of 100 to 200° C., preferably 140° to 170° C.

There may be adopted a process in which the reaction with the bisphenol is first carried out and the reaction with the secondary alkanolamine is then carried out, or the reaction order may be reversed. Alternatively, the epoxy resin may be reacted simultaneously with the bisphenol and the secondary alkanolamine.

Since the reaction between the epoxy group and the amine is rapidly advanced, a process in which the secondary alkanolamine is slowly added to a reaction vessel charged with the epoxy resin is adopted for the reaction of the epoxy resin with the secondary alkanolamine.

The reaction between the epoxy resin and the bisphenol is slow, and the reaction is conducted: ordinarily for 3 to 10 hours and preferably for 4 to 7 hours. If the reaction time is too long, all of the hydroxyl group of the bisphenol is reacted with the epoxy group, or all of the epoxy group of the epoxy resin is reacted with the hydroxyl group of the bisphenol, and therefore, the reaction should be controlled so that a modified epoxy resin composition containing the intended amounts of the phenolic hydroxyl group and the epoxy group is obtained.

It cna be easily determined by experiments what modified epoxy resin can be obtained according to the epoxy content of the starting epoxy resin, the amount used of the bisphenol, the amount used of the secondary alkanolamine, the reaction method and the reaction conditions, and therefore, an intended epoxy resin can be prepared based on these experimental results.

In the case where a modified resin is prepared according to the above-mentioned process, since the epoxy group present at the terminal of the molecule of the starting epoxy resin is reacted with the phenolic hydroxyl group of the bisphenol and the amino group the secondary alkanolamine, the phenolic hydroxyl group and primary alcoholic hydroxyl group are made present at the terminal of the molecule of the epoxy resin. For example, when bisphenol A is used as the bisphenol and diethanolamine is used as the secondary alkanolamine,

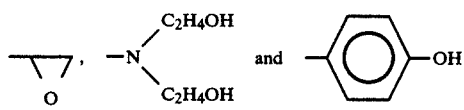

are mainly present as the terminal functional groups of the modified epoxy resin.

A paint composition comprising the modified epoxy resin composition will now be described.

When the modified epoxy resin composition of the present invention is mixed with a curing agent resin having an active methylol group, there can be obtained a resin for a paint of the baking type, which gives a coating having an excellent flexibility.

As the curing agent resin, there can be mentioned a resol type phenolic resin and an amino resin (such as a melamine, a urea resin, a benzoguanamine resin or an aniline aldehyde resin).

It is preferred that the modified epoxy resin composition/curing agent resin weight ratio is from 90/10 to 65/35.

The curing conditions of this paint are a baking temperature of 200° to 270° C. and a baking time of 30 seconds to 10 minutes.

Not only a solvent but also an additive customarily used for an epoxy resin, such as a colorant, can be incorporated in the paint composition of the present invention.

The coating obtained from the paint composition of the present invention has a good flexibility, and even if the coated steel sheet is bent or subjected to other processing, the coating is hardly damaged. Therefore, a coating excellent in the processability can be provided. Moreover, since the modified epoxy resin has a high reactivity, the baking time can be shortened and the coating operation is carried out economically advantageously. The adhesion to a steel sheet and a treated steel sheet such as a galvanized iron sheet or tinplate is excellent.

An excellent paint of the baking type is obtained by combining the modified epoxy resin composition of the present invention with a resol resin or amino resin.

Moreover, the paint composition of the present invention is used as an undercoating paint.

The present invention will now be described in detail with reference to the following examples that by no means limit the scope of the invention. The properties mentioned in the examples were determined according to the methods described below. Number Average Molecular Weight ($\overline{Mn}$)

The number average molecular weight was measured by the gel permeation chromatography (GPC). Tetrahydrofuran was used as the eluting solvent, and the eluting temperature was 40° C. HSG 20, HSG 40, HSG 50 and HSG 60 supplied by Shimazu were used as the column. Conversion of the molecular weight was performed by using monodisperse polystyrene having a known molecular weight as the reference substance. Epoxy Group Content The epoxy equivalent was measured according to the following method, and the epoxy group content (equivalent/g) was expressed by the reciprocal number of the measured value.

Method for Measuring Epoxy Equivalent

1. In an Erlenmeyer flask having a capacity of 200 ml, precisely weighed 0.2 or 10 g of an epoxy resin was charged, and 25 ml of dioxane was added to form a solution.
2. Precisely measured 25 ml of a 1/5N hydrochloric acid solution (dioxane solution) was added to the above solution, and the flask was plugged, and the liquid was sufficiently mixed and allowed to stand still for 30 minutes.
3. Then, 50 ml of a toluene/ethanol mixed solution (1/1 volume ratio) was added to the liquid, and titration was carried out with a 1/10N sodium hydroxide solution by using Cresol Red as the indicator.
4. The epoxy equivalent A was calculated according to the following formula:

$$A = \frac{W \times 1000}{(Q - S) \times 0.1 \times f}$$

wherein W stands for the weight (g) of the sample, S stands for the amount (ml) of the 1/10N sodium hydroxide solution used for the titration, f stands for the titer of the 1/10 N sodium hydroxide solution, and Q stands for the amount (ml) of the 1/10N sodium hydroxide solution used for the titration at the blank test.

Phenolic Hydroxyl Group

Coloration was effected by using 3-methyl-2-benzothiazolinone-hydrazone hydrochloride, and the determination was conducted by measuring the absorbance at 510 nm. (Bisphenol A was used as the reference substance and a calibration curve was formed.)

Incidentally, the amount of the primary alcoholic hydroxyl group was calculated from the amount used of the secondary alkanolamine.

Example 1

A four-neck flask having a capacity of 2 l, which was equipped with a stirrer, a thermometer and a dropping funnel, was charged with 800 g of a bisphenol A type liquid epoxy resin having an epoxy equivalent of 188 and a number average molecular weight ($\overline{Mn}$) of 370, 394 g of bisphenol A and 60 g of xylene, and the temperature was elevated with stirring. When the temperature was elevated to 140° C., 62.7 g of diethanolamine was added dropwise over a period of 1 hour and reaction was carried out at 160° C. for 7 hours to obtain a modified epoxy resin containing, as terminal functional groups, $11 \times 10^{-5}$ equivalent/g of an epoxy group, $8 \times 10^{-5}$ equivalent/g of a phenolic hydroxyl group and $95 \times 10^{-5}$ equivalent/g of a primary alcoholic hydroxyl group and having a number average molecular weight ($\overline{Mn}$) of 2650.

To the obtained composition were added 200 g of butyl cellosolve, 550 g of cyclohexanone and 1075 g of xylene to obtain a resin solution A having a solid content of about 40%.

A paint was prepared by adding a resol type phenolic resin (Hitanol 4010 supplied by Hitachi Kasei) as the curing agent resin to the resin solution A at a resin solution/curing agent resin ratio of 7/3 or 8/2 (as the solids).

Tinplate having a size of 0.3 mm × 50 mm × 150 mm was degreased and this paint was coated on the tinplate by a bar coater so that the coating thickness was 7 to 8 um. Baking was carried out at a temperature of 200° C. for 5 to 10 minutes.

The obtained coating was subjected to the MEK rubbing test and the impact bending pitting test, and the state of the coating surface and the adhesion after 1 hour's boiling were examined.

At the MEK rubbing test, the surface of the coating was rubbed with a paper impregnated with MEK (methylethylketone), and the frequency of rubbing conducted until the coating was peeled was counted and shown.

At the impact bending pitting test, the tinplate was cut into a size of 30 mm × 50 mm, and the cut tinplate was bent by a mandrel. By using a Du Pont type impact tester, a load of 1 kg was let to fall on the test piece from a height of 100 cm, and the crushed test piece was immersed in an aqueous solution of copper sulfate for 1 minute and the surface state was evaluated according to the following scale.

⊙: no pitting
○: pitting area smaller than 10%
∆: pitting area of 10 to 30%
X: pitting area of 30 to 50%
XX: pitting area larger than 50%

After 1 hour's boiling, the whitening of the coating and the adhesion were examined for the evaluation of the state.

The whiteness was evaluated with the naked eye.

The adhesion was evaluated by forming square cuts having a size of 1 mm on the coating, immersing the coating in boiling water for 1 hour, removing water from the coating and carrying out an adhesive cellophane tape peeling test.

The obtained evaluation results are shown in Table 1.

EXAMPLE 2

An epoxy resin composition comprising, as terminal functional groups, $6 \times 10^{-5}$ equivalent/g of an epoxy group, $11.2 \times 10^{-5}$ equivalent/g of a phenolic hydroxyl group and $64 \times 10^{-5}$ equivalent/g of a primary alcoholic hydroxyl group and having a number average molecular weight ($\overline{Mn}$) of 3580 was prepared by reacting 500 g of a bisphenol A type liquid epoxy resin, 268 g of bisphenol A, 40 g of xylene and 26.9 g of diethanolamine in the same manner as described in Example 1.

The composition was mixed with 118 g of butyl cellosolve, 353 g of cyclohexanone and 681 g of xylene to form a resin solution B having a solid content of about 40%.

The resin solution B was mixed with the curing agent resin used in Example 1 at the resin/curing agent ratio of 7/3 or 8/2 as the solids.

The obtained paint was coated in the same manner as described in Example 1, and the formed coating was evaluated in the same manner as described in Example 1. The evaluation results are shown in Table 1.

COMPARATIVE EXAMPLE 1

A resin solution having a solid content of 60% was prepared by using a bisphenol A type epoxy resin:- (EPOMIK PR-307 supplied by Mitsui Petrochemical, epoxy equivalent = 2000, number average molecular weight ($\overline{Mn}$) = 2700) and a mixed solvent containing xylene and cyclohexanone at a ratio of 6/4.

A paint was prepared by adding the curing agent resin used in Example 1 to the resin solution at the resin/curing agent ratio of 7/3 as the solids.

The paint was coated in the same manner as described in Example 1, and the coating was evaluated in the same manner as described in Example 1. The evaluation results are shown in Table 1.

COMPARATIVE EXAMPLE 2

A paint was prepared in the same manner as described in Example 1 except that a bisphenol A type epoxy resin (EPOMIK R-367 supplied by Mitsui Petrochemical, epoxy equivalent = 1250, number average molecular weight ($\overline{Mn}$) = 2500) was used, and the coating was evaluated in the same manner as described in Example 1. The evaluation results are shown in Table 1.

COMPARATIVE EXAMPLE 3

A resin solution having a solid content of 40% was prepared by using a bisphenol A type epoxy resin (EPOMIK R-309 supplied by Mitsui Petrochemical, epoxy equivalent = 2800, number average molecular weight ($\overline{Mn}$) = 3800) and a mixed solvent comprising xylene and cyclohexanone at a ratio of 6/4.

A paint was prepared by using this resin solution in the same manner as described in Example 1, and the coating was evaluated in the same manner as described in Example 1. The evaluation results are shown in Table 1.

ated during this operation, the temperature was maintained at 60.C by air cooling.

TABLE 1

| | Resin/Curing Agent Mixing Ratio | MEK Rubbing | | | Bending Processability | | |
|---|---|---|---|---|---|---|---|
| | | 5 minutes* | 7 minutes* | 10 minutes* | 5 minutes* | 7 minutes* | 10 minutes* |
| Comparative Example 1 | 7/3 | 4 | — | 19 | XX | | Δ |
| Comparative Example 2 | 7/3 | 5 | 23 | 88 | XX | XX | Δ |
| Comparative Example 3 | 8/2 | 5 | 14 | 140 | XX | Δ | |
| Example 1 | 7/3 | 20 | 34 | 210 | Δ | | |
| | 8/2 | 8 | 25 | 80 | | | ~ |
| Example 2 | 7/3 | 108 | 115 | 430 | | | |
| | 8/2 | 47 | 89 | 216 | | | ~ |

| | | Appearance After 1 Hour's Boiling | | | Adhesion After 1 Hour's Boiling | | |
|---|---|---|---|---|---|---|---|
| | | 5 minutes* | 7 minutes* | 10 minutes* | 5 minutes* | 7 minutes* | 10 minutes* |
| | Comparative Example 1 | whitening | whitening | whitening | | | |
| | Comparative Example 2 | whitening | good | good | | | |
| | Comparative Example 3 | whitening | whitening | good | | | |
| | Example 1 | whitening | good | good | | | |
| | | whitening | good | good | | | |
| | Example 2 | whitening | good | good | | | |
| | | whitening | good | good | | | | note *baking time

EXAMPLE 3

A 4-neck flask having a capacity of 2 l, which was equipped with a stirrer, a thermometer and a dropping funnel, was charged with 400 g of a bisphenol A type epoxy resin having an epoxy equivalent of 188 and a number average molecular wight ($\overline{Mn}$) of 370, 189 g of p,p'-bisphenol F, 60 g of xylene and 5.1 ml of a 0.1N NaOH aqueous solution, and the temperature was elevated with stirring. When the temperature was elevated to 150° C., the pressure was reduced and xylene and water were removed, and reaction was carried out at 150° C. for 1 hour. Then, 30 g of xylene was added to the reaction mixture, and 18 g of diethanolamine was added dropwise over a period of 1 hour and reaction was carried out at 160° C. for 5 hours. The obtained resin composition had a number average molecular weight ($\overline{Mn}$) of 3640 and comprised, as terminal functional groups, $1.25 \times 10^{-3}$ equivalent/g of an epoxy group, $1.2 \times 10^{-3}$ equivalent/g of a phenolic hydroxyl group and $5.6 \times 10^{-3}$ equivalent/g of a primary alcoholic hydroxyl group.

To the composition were added 364 g of butyl cellosolve and 516 g of xylene to obtain a resin solution having a solid content of 40%.

A paint was prepared by adding a resol type phenolic resin as the curing agent resin to the resin solution, and the paint was coated on the surface of a steel sheet having a thickness of 0.3 mm and baking was carried out at 230° C. for 33 seconds to obtain a cured coating having a thickness of 5 μm.

The physical properties of the cured coating are shown in Table 2.

A 2-liter 4-neck flask equipped with a stirrer, a thermometer, a dropping funnel and an azeotropic degydration device was charged with 300 g of p,p'-bisphenol F, 1665 g of epichlorohydrin and 20 g of H₂O, and the temperature was elevated to 60° C. and 200 g of an aqueous solution of NaOH having a concentration of 48% by weight was added to the mixture. Then, the mixture was stirred for 1 hour. Since heat was generated during this operation, the temperature was maintained at 60.C by air cooling.

Then, the pressure was reduced to 210 mmHg and while the azeotropic dehydration was carried out, 200 g of an aqueous solution of NaOH having a concentration of 48% by weight was added dropwise to the mixture over a period of 2 hours.

Then, epichlorohydrin was removed by distillation under a reduced pressure, and the pressure was returned to the atmospheric pressure. Then, 495 g of warm water maintained at 80° C. was added to the residue and an aqueous solution of sodium chloride was separated and removed.

Then, warm water maintained at 80° C. was added to the recovered product to effect washing, and 250 g of an aqueous solution of NaOH having a concentration of 6% by weight was added and reaction was carried out at 90° C. for 1.5 hours. Then, 500 g of xylene was added to the reaction mixture and the liquid separation was carried out.

Then, 50 g of an aqueous solution of NaH₂PO₄ having a concentration of 10% by weight to effect neutralization, and the liquid separation was carried out again.

The oil layer was heated to effect azeotropic dehydration. and the precipitated salt was removed by filtration using a glass filter G4. The recovered oil layer was heated and concentrated to obtain 437 g of a bisphenol F type epoxy resin having an epoxy equivalent of 167.

Then, 200 g of the obtained bisphenol A type epoxy resin was mixed with 62.1 g of bisphenol A, 130 g of exylene and 20.3 ml of a 0.1N aqueous solution of NaOH, and 9.7 g of diethanolamine was added to the mixture and reaction was carried out in the same manner as described in Example 3 to obtain a modified epoxy resin composition.

The number average molecular weight of the obtained resin composition was 3050, and the resin composition contained, as terminal functional groups, $1.25 \times 10^{-4}$ equivalent/g of an epoxy group, $1.1 \times 10^{-4}$ equivalent/g of a phenolic hydroxyl group and $6.8 \times 10^{-4}$ equivalent/g of a primary alcoholic hydroxyl group.

A cured coating was formed by using this resin composition in the same manner as described in Example 3. The physical properties of the obtained coating are shown in Table 2.

TABLE 2

| | Physical Properties of Starting Resin | | | Resin/ Curing Agent Ratio | Physical Properties of Cured Coating | | | | |
|---|---|---|---|---|---|---|---|---|---|
| | | | | | Bending Characteristics | | Scratch*3 Resistance | Gloss*4 (after 2 hours' boiling) | Elongation (%)*5 |
| | Mn | Mw | Mw/Mn | | 1T*1 | 2T*2 | | | |
| Example 3 | 2690 | 8000 | 3.0 | 8.5/1.5 | 3 | 4 | 3 | 68.2 | 4.0 |
| | 2690 | 8000 | 3.0 | 9/1 | 3+ | 4+ | 3− | 58.7 | (6)*6 |
| Example 4 | 3050 | 8730 | 2.9 | 8.5/1.5 | 2+ | 3+ | 3 | 76.5 | 4.0 |
| | 3050 | 8730 | 2.9 | 9/1 | 4− | 4+ | 3− | 71.2 | (6)*6 |

Note
*1 bent with intermediate coated metal sheet as spacer (thickness = 0.3 mm)
*2 bent with two intermediate coated metal sheets as spacer (thickness = 0.3 mm)
*3 periphery of 10-yen coin was pressed to coating at angle of 45°, coating was strongly scratched, and state of coating was examined with naked eye
*4 coating was boiled for 2 hours, and gloss was determined by measuring light reflection in direction of normal
*5 paint was coated on copper foil and baked, coating was immersed in aqueous solution of ferric chloride to dissolve and remove copper, and elongation of obtained free film was measured
*6 parenthesized value was estimate value (based on assumption that value would be larger than measured value shown on upper line)

We claim:

1. A modified epoxy resin composition having a number average molecular weight ($\overline{Mn}$) of 2000 to 4000 and containing, as terminal functional groups of the molecule (i), $1 \times 10^{-5}$ to $30 \times 10^{-5}$ equivalent/g of an epoxy group (ii), $5 \times 10^{-5}$ to $15 \times 10^{-5}$ equivalent/g of a phenolic hydroxyl group and (iii) $34 \times 10^{-5}$ to $150 \times 10^{-5}$ equivalent/g of a primary alcoholic hydroxyl group wherein said phenolic hydroxyl group is derived from a polyphenol and said primary alcoholic hydroxyl group is derived from a secondary alkanolamine.

2. A modified epoxy resin composition as set forth in claim 1, which is obtained by reacting a bisphenol epoxy resin with a bisphenol and a secondary alkanolamine.

3. A modified epoxy resin composition as set forth in claim 2, wherein the bisphenol epoxy resin is a bisphenol F epoxy resin and the bisphenol is bisphenol A.

4. A modified epoxy resin composition as set forth in claim 2, wherein the bisphenol epoxy resin is a bisphenol A epoxy resin and the bisphenol is bisphenol F.

5. A process for the preparation of a modified epoxy resin having a number average molecular weight ($\overline{Mn}$) of 2000 to 4000 and containing, as functional groups (i) $1 \times 10^{-5}$ to $30 \times 10^{-5}$ equivalent/g of an epoxy group, (ii) $5 \times 10^{-5}$ to $15 \times 10^{-5}$ equivalent/g of a phenolic hydroxyl group, and (iii) $40 \times 10^{-5}$ to $150 \times 10^{-5}$ equivalent/g of a primary alcoholic hydroxyl group, which comprises reacting a bisphenol epoxy resin with a bisphenol and a secondary alkanolamine in amounts satisfying requirements represented by the following general formula (i) and (ii):

$$\frac{40}{100} \leq \frac{Y}{X} \leq \frac{95}{100} \quad (i)$$

and $$\frac{10}{100} < \frac{Z}{X} \leq \frac{50}{100} \quad (ii)$$

wherein X stands for the amount (equivalent) of the epoxy group

6. A modified epoxy resin having a number average molecular weight ($\overline{Mn}$) of 2000 to 4000, said modified epoxy resin obtained by reacting a bisphenol epoxy resin with a bisphenol and diethanolamine and having a combined terminal group comprising (i) $1 \times 10^{-5}$ to $30 \times 10^{-5}$ equivalent/g of an epoxy group, (ii) $5 \times 10^{-5}$ to $15 \times 10^{-5}$ equivalent/g of a phenolic hydroxyl group, and (iii) $40 \times 10^{-5}$ to $150 \times 10^{-5}$ equivalent/g of a primary alcoholic hydroxyl group.

7. A process for the preparation of a modified epoxy resin ahving a number average molecular weight ($\overline{Mm}$) of 2000 to 4000 and containing, as functional groups, (i) $1 \times 10^{-5}$ to $30 \times 10^{-5}$ equivalent/g of an epoxy group, (ii) $5 \times 10^{-5}$ to $15 \times 10^{-5}$ equivalent/g of a phenolic hydroxyl group, and (iii) $40 \times 10^{-5}$ to $150 \times 10^{-5}$ equivalent/g of a primary alcoholic hydroxyl group, which comprises reacting a bisphenol epoxy resin with a bisphenol and a secondary alkanolamine in amounts satisfying requirements by the following general formula (i) and (ii):

$$\frac{40}{100} \leq \frac{Y}{X} \leq \frac{95}{100} \quad (i)$$

and $$\frac{10}{100} < \frac{Z}{X} \leq \frac{50}{100} \quad (ii)$$

wherein X stands for the amount (equivalent) of the epoxy group in the starting epoxy resin, Y stands for the amount (equivalent) of the phenolic hydroxyl group of the bisphenol, and Z stands for the amount (mole) of the secondary alkanolamine, in the absence of a catalyst.

8. A process according to claim 7, wherein the reaction is carried out at a temperature of 100° to 200° C. in the presence of a solvent inactive with an epoxy group.

* * * * *

UNITED STATES PATENT AND TRADEMARK OFFICE
CERTIFICATE OF CORRECTION

PATENT NO. : 4,987,205
DATED : January 22, 1991
INVENTOR(S) : SUZUKI et al.

It is certified that error appears in the above-identified patent and that said Letters Patent is hereby corrected as shown below:

Column 11:

Line 29, change "groupsof the" to --groups of the--

Line 32, change "$34 \times 10^{-5}$" to --$40 \times 10^{-5}$--

Column 11:

Line 56, change "by thef ollowing" to --by the following--

Column 12:

Line 24, after "epoxy group" insert --in the starting epoxy resin, Y stands for the amount (equivalent) of the phenolic hydroxyl group of the bisphenol, and Z stands for the amount (mole) of the secondary alkanolamine.--

Column 12:

Line 35, change "resin ahving" to --resin having-- and change "$(\bar{M}n)$" to --$(\overline{M}n)$--

Signed and Sealed this

Sixth Day of October, 1992

Attest:

DOUGLAS B. COMER

Attesting Officer　　　Acting Commissioner of Patents and Trademarks